United States Patent [19]

Kuroiwa et al.

[11] 4,420,972
[45] Dec. 20, 1983

[54] AIR INTAKE MEASURING APPARATUS FOR INTERNAL COMBUSTION ENGINE

[75] Inventors: Hiroshi Kuroiwa, Hitachi; Yoshishige Oyama, Katsuta, both of Japan

[73] Assignee: Hitachi, Ltd., Tokyo, Japan

[21] Appl. No.: 337,819

[22] Filed: Jan. 7, 1982

[30] Foreign Application Priority Data

Jan. 13, 1981 [JP] Japan .................................. 56-4428

[51] Int. Cl.³ .......................................... G01M 15/00
[52] U.S. Cl. ......................................... 73/118; 73/202
[58] Field of Search ........................ 73/202, 118, 204; 123/478

[56] References Cited

U.S. PATENT DOCUMENTS 3,776,208 12/1973 Stumpp .......................... 123/119 R
4,366,704 1/1983 Sato et al. .............................. 73/118

Primary Examiner—Jerry W. Myracle
Attorney, Agent, or Firm—Antonelli, Terry & Wands

[57] ABSTRACT

An air intake measuring apparatus for an internal combustion engine comprises a bypass passageway formed in a throttle body by bypassing a venturi section in a suction passage, and a thermal probe arranged in the bypass passageway for determining the air intake by measuring the flow velocity of an air current flowing through the bypass passageway. A venturi member for forming in the throttle body the venturi section and the bypass passageway is force fitted in the throttle body to provide a unitary structure. The bypass passageway has an inlet port of a static pressure introducing type formed on the side of the suction passage and outlet ports formed in the venturi section close to the inlet port, while the thermal probe is located in the bypass passageway in a segment thereof of a minimum cross-sectional area.

8 Claims, 5 Drawing Figures

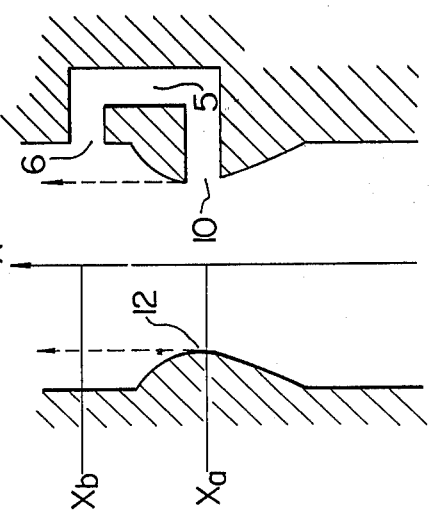
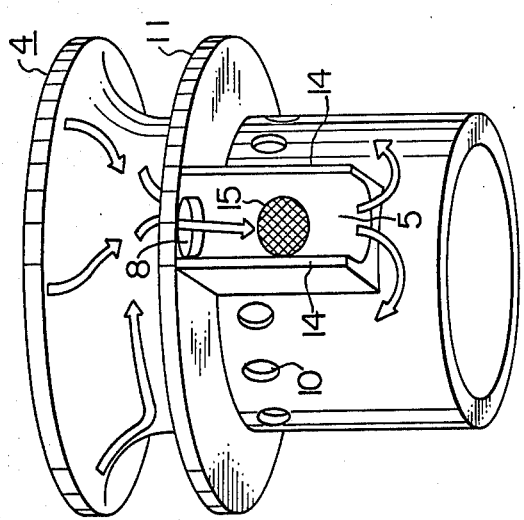
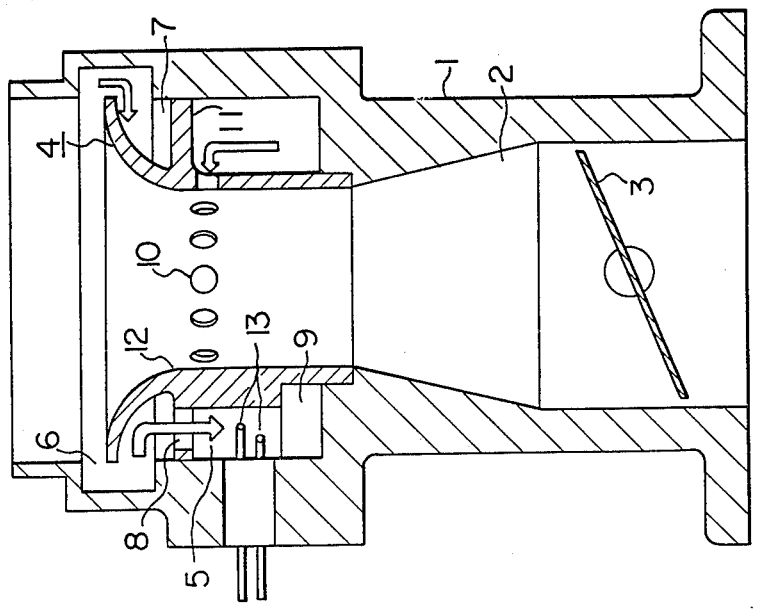
FIG. 1
FIG. 2
FIG. 3

AIR INTAKE MEASURING APPARATUS FOR INTERNAL COMBUSTION ENGINE

BACKGROUND OF THE INVENTION

1. Field of the Invention

This invention relates to air intake measuring apparatus for internal combustion engines, and more particularly it is concerned with an air intake measuring apparatus using a thermal probe for an internal combustion engine.

2. Description of the Prior Art

Several types of apparatus are available for measuring the air intake of internal combustion engines. Of these apparatus, an air intake measuring apparatus using a thermal probe offers advantages in that it is highly responsive and capable of measuring the mass flow rate of air, so that the need to effect pressure compensation can be eliminated.

Generally, an air intake measuring apparatus comprises a bypass passageway for an air intake pipe having a thermal probe arranged therein, as shown in U.S. Pat. No. 3,776,208, for example. An air intake measuring apparatus of this construction has a characteristic such that it produces as an output a signal corresponding to the flow velocity of an air current flowing through the bypass passageway irrespective of its direction. Thus, when a flow-back phenomenon occurs in which the suction air flows back from cylinders to an intake manifold in the suction and exhaust valves overlapping period at low-speed, high-load operation of the internal combustion engine, the flown-back air would also be measured as an air intake and added thereto. This would cause fuel to be inadvertently supplied in an amount increased corresponding to the flown-back air, thereby rendering the fuel-air mixture overenriched.

When a backfire phenomenon occurs, minute particles of soot would enter the bypass passageway and be get adhered to the thermal probe. Moreover, the dust that has not been removed by an air cleaner would enter the bypass passageway and pollute the thermal probe. This would make it impossible to effect accurate measurements of the air intake.

Moreover, it is necessary to work on the throttle body to form openings therein when the bypass passageway is formed, so that the operation of forming the openings in the throttle body and assembling parts have been troublesome.

SUMMARY OF THE INVENTION

This invention has as its object the provision of an air intake measuring apparatus for an internal combustion engine which is capable of measuring air intake with a high degree of accuracy even if a reverse current flows through the air intake pipe due to flow-back phenomenon or backfire, and which can be readily worked on and assembled.

According to the invention, there is provided an air intake measuring apparatus for an internal combustion engine comprising (a) a suction passage formed in a throttle body, (b) a throttle valve arranged in the suction passage, (c) a venturi member including a venturi section force fitted in the suction passage upstream of the throttle valve, (d) a bypass passageway defined between the throttle body and the venturi member, the bypass passageway communicating a bypass inlet port defined by the venturi member and the throttle body and opening perpendicular to the axis of the suction passage with a bypass outlet port opening in the venturi section of the venturi member, and (e) a thermal probe arranged in the bypass passageway.

BRIEF DESCRIPTION OF THE DRAWINGS

FIG. 1 is a sectional view of the throttle body in explanation of the air intake measuring apparatus according to an one embodiment of the invention;

FIG. 2 is a perspective view of the venturi member shown in FIG. 1;

FIG. 3 is a schematic view showing the throttle valve shown in FIG. 1;

DETAILED DESCRIPTION OF THE PREFERRED EMBODIMENTS

Figure 4:
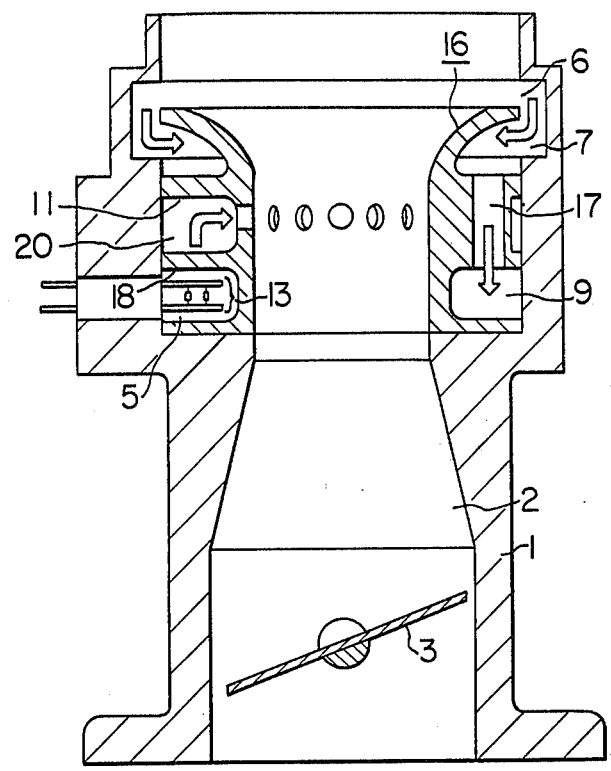
FIG. 4 is a sectional view of the throttle body supporting the intake measuring apparatus according to another embodiment of the invention.

Preferred embodiments of the invention will now be described in detail.

Referring to FIG. 1, a throttle body 1 is formed with a suction passage 2 having a throttle valve 3 mounted therein and a venturi member 4 force fitted therein upstream of the throttle valve 3, to define a bypass passageway 5. Defined between the venturi member 4 and the throttle body 1 are a bypass inlet port 6 which is an annular gap, an annular upper chamber 7 communicating with the bypass inlet 6, the bypass passageway 5 communicating with the upper chamber 7 via a communicating port 8, and an annular lower chamber 9 communicating with the bypass passageway 5. A plurality of bypass outlet ports 10 open in an upper portion of the lower chamber 9. Thus air entering the bypass inlet 6 flows through the upper chamber 7, communicating port 8 formed in a partition plate 11, bypass passageway 5 and lower chamber 9 into a venturi section 12 via the plurality of outlet ports 10. This air current is automatically generated by a negative or subatmospheric pressure produced in the bypass outlet ports 10 by the air current flowing through the venturi section 12 and its flow rate is proportional to the main air current.

A probe 13 including a pair of probe members 13 is arranged in the bypass passageway 5, the pair of probe members being located such that they do not overlap with respect to the air current. One of the air probe members 13 is intended for compensating for temperature and the other probe member 13 is for measuring the flow rate.

FIG. 2 is a perspective view of the venturi member 4 shown in FIG. 1. The venturi member 4 includes the partition plate 11 of a disc shape formed along the outer periphery of its intermediate portion and having the communicating port 8 formed therein. A pair of partition walls 14 located on opposite sides of the communicating port 8 cooperate with the throttle body 1 for defining the bypass passageway 5, and the plurality of bypass outlet ports 10 are formed in the venturi member 4 immediately beneath the partition plate 11 except for the portion thereof serving as the bypass passageway 5. A portion 15 in the bypass passageway 5 which has crossed lines is where the thermal probe 13 is located.

In the air intake measuring apparatus having the venturi member 4 of the aforesaid construction, a bypass air current is produced when a subatmospheric pressure is generated at the outlet ports 10 as suction air flows in the venturi section 12. The bypass air current has its flow velocity increased as it flows through the bypass passageway 5 of the smallest cross-sectional area, to enable the thermal probe 13 to operate at high sensitivity. More specifically, the bypass inlet port 6 is annular in shape and wide and the bypass outlet ports 10 are large in number, so as to increase as much as possible the cross-sectional area of the passageway. The bypass inlet port 6 opens at right angles to the axis of the suction passage 2 so as to enable a static pressure on the side of the main suction current can be taken advantage of. This stabilizes the air current flowing in and through the bypass passageway 5, to enable a stable output signal to be produced. Moreover, the bypass inlet port 6 and the bypass outlet ports 10 are located relatively close to each other, so that it is possible to minimize errors that might occur in measuring the flow rate of air intake when flow-back phenomenon occurs.

Referring to FIG. 3 which shows the venturi member 4 schematically, a flow-back air from the cylinders is a reverse current as contrasted with a steadystate current and flows through the suction passage in a portion thereof indicated by broken lines with upwardly directed arrows. Analysis of an air current generated at this time in the bypass passage 5 opening through the outlet ports 10 in the venturi section 12 shows that such air current can be expressed by the following equation:

$$\frac{\partial U}{\partial t} + U \frac{\partial U}{\partial t} = -\frac{1}{\rho} \frac{\partial P}{\partial t} \qquad (1)$$

where U is the velocity of a fluid, P is the pressure and $\rho$ is the density of the fluid.

The product of the flow velocity of a fluid flowing through a channel and the cross-sectional area of the channel is constant at all times, so that the following relation holds:

$$\frac{\partial}{\partial t}(U \cdot A) = 0 \qquad (2)$$

where A is the cross-sectional area of the channel.

By integrating the section from a cross section a to a cross section b in the direction of an arrow X in FIG. 3 in the suction passage, we get the following relation:

$$\frac{\partial}{\partial t} \int_{X_a}^{X_b} U \cdot dx + \tfrac{1}{2}(U_b^2 - U_a^2) = \frac{P_a - P_b}{\rho} \qquad (3)$$

The results of experiments showed that when a flow-back phenomenon occurs in reverse flow, air current separation occurs in the section between the cross sections and b with the broken lines serving as the boundary and the substantial air flow does not occur in the space located radially outwardly of this boundary, so that Ua=Ub in this case. Thus equation (3) can be rewritten as follows:

$$\frac{\partial}{\partial t}(X_b - X_a)U_a = \frac{P_a - P_b}{\rho} \qquad (4)$$

That is, when the flow velocity Ua in the position Xa undergoes changes with time, Pa−Pb changes in accordance with the change in Ua, as can be clearly seen in equation (4).

In steadystate operation, Ua is constant, so that Pa=Pb and substantial reverse flow is not produced in the bypass passageway 5. However in nonsteadystate operation, a flow is produced due to the static pressure differential Pa−Pb. That is, when a reverse current occurs in nonsteadystate operation, such as when a flow-back phenomenon occurs, a reverse flow will occur in the bypass passageway 5 too. In the case of also a reverse flow in nonsteadystate operation, it is effective to reduce the value of the left side (Xb−Xa) of equation (4) to bring the value of (Pa−Pb) closer to zero, so as to bring the flow in the bypass passageway 5 to a halt. Stated differently, it is effective to reduce the distance (Xb−Xa) between the inlet port 6 and the outlet ports 10 of the bypass passageway 5.

As shown in FIG. 1, the inlet port 6 is relatively close to the outlet ports 10, and it is possible to reduce the value of (Xb−Xa) shown in FIG. 3. As a result, the differential pressure (Pa−Pb) is reduced, to enable a reverse flow of air through the bypass passageway 5 to be reduced when a flow-back phenomenon occurs.

Further, since the bypass inlet port 6 and bypass outlet ports 10 of the bypass passageway 5 open annularly, the bypass passageway 5 may be disposed symmetrically with respect to the axis of the suction passage 2. The result of this is that the air current is prevented from deviating from its normal course between the positions downstream and upstream of the venturi section 12, and hence is rendered uniform at all times. Also, since the bypass passageway 5 has openings of the stationary pressure introducing type as aforesaid, it is possible to avoid inflow into the bypass passageway 5 and deposition on the thermal probe 13 of dust contained in the air and carbon grits flowing when a backfire occurs. The air intake measuring apparatus according to the illustrated embodiment has parts arranged symmetrically with respect to its axis, so that fabrication and assembling of parts can be readily carried out and production cost can be reduced.

In the embodiment of the air intake measuring apparatus shown and described hereinabove, the venturi body is force fitted in the throttle body and the thermal probe is arranged in a channel of a minimized cross-sectional area communicating an annular inlet port with annular outlet ports of a bypass passageway formed in the venturi body, as aforesaid. By virtue of this structural relationship, the sensitivity of the thermal probe can be improved and the influences exerted on the performance of the thermal probe by a reverse flow when a flow-back phenomenon occurs can be reduced; pollution of the thermal probe by the dust contained in the suction air and the carbon grits flowing when a backfire occurs can be avoided; and fabrication and assembling can be carried out with ease.

Figure 5:
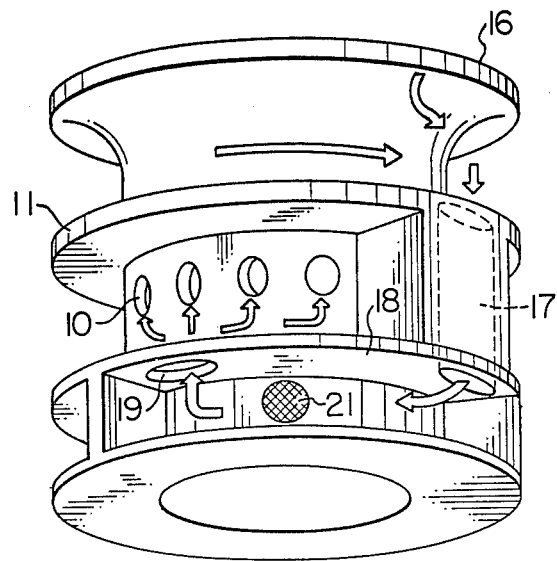
FIG. 5 is a perspective view of the venturi member shown in FIG. 4.

FIG. 4 is a sectional view of the throttle body supporting the air intake measuring apparatus according to another embodiment, and FIG. 5 is a perspective view of the venturi member force fitted in the throttle body shown in FIG. 4. In these figures, parts similar to those shown in FIG. 1 are designated by like reference characters The venturi member 16 force fitted in the throttle body 1 in this embodiment defines an air passageway presently to be described.

Air introduced through the annular bypass inlet port 6 flows through the upper chamber 7, a communicating port 17 formed in the venturi member 16, the lower chamber 9 communicated with the upper chamber 7 via the communicating port 17, the bypass passageway 5 of a minimized cross-sectional area having the thermal probe 13 mounted therein, a communicating port 19 formed in a partition plate 18, and a hollow space 20 defined between the partition plates 11 and 18 and communicating with the lower chamber 9 through the communicating port 19, into the venturi section 12 of the suction passage 2.

In this air flow passageway, the bypass passageway 5 mounting the probe 13 has a minimized cross-sectional area and the air flowing through the bypass inlet port 6 and bypass outlet ports 10 of a large cross-sectional area has its flow velocity maximized in the bypass passageway 5, to enable the flow velocity to be measured with a high sensitivity.

FIG. 5 is a perspective view of the venturi member shown in FIG. 4, in which parts similar to those shown in FIG. 4 are designated by like reference characters. The venturi member is constructed to define three chambers arranged vertically and the bypass passageway 5 disposed at its lowermost end has the thermal probe 13 arranged in a position indicated by crossed lines at 21 in a manner to be perpendicular to the direction of flow of the air current in the suction passage 2. Thus the passageway in which the thermal probe 13 is arranged is horizontal as contrasted with the passageway in which the thermal probe 13 is mounted in the embodiment shown in FIG. 1 which is vertical.

The embodiment of the air intake measuring apparatus shown in FIGS. 4 and 5 has, as described hereinabove the throttle body including the venturi member force fitted therein and formed with annular passages in three layers, and the thermal probe 13 is arranged in the bypass passageway 5 disposed horizontally. The embodiment of this construction can achieve substantially the same effects as the embodiment described by referring to FIGS. 1 and 2.

From the foregoing description, it will be appreciated that the air intake measuring apparatus for an internal combustion engine according to the invention offers many advantages. Measurements can be made with a high degree of accuracy without being affected by a reverse flow that would be produced when a flow-back phenomenon or a backfire occurs in the suction passage. The dust in the suction air and the carbon grits flowing when a reverse flow takes place are difficultly introduced into the bypass passageway, so that the risk of them being deposited on the thermal probe can be minimized. Further, fabrication and assembling can be carried out with ease.

We claim:

1. An air intake measuring apparatus for an internal combustion engine, comprising:
   a main air path;
   a bypass for passing an amount of air in a predetermined ratio with respect to an amount of air passing through said main air path, said bypass being comprised of a straight path portion connected to an inlet of said bypass and a circumferentially curved path portion connected to an outlet of said bypass, at least a part of said curved path portion situated closest to an outlet end of said straight path portion being separated by a wall relative to said main air path, whereby the amount of air passing through the bypass will be directed, thereby, circumferentially of said main air path prior to returning to the main air path via said outlet; and
   an air flow rate measuring element disposed in said bypass.

2. An air intake measuring apparatus as claimed in claim 1, wherein said outlet of the bypass is connected to the end of the separated part of said curved path, in a direction of air flow therethrough, by way of a bypass portion disposed therebetween.

3. An air intake measuring apparatus as claimed in claim 1, wherein a bypass portion, in the form of a hollow space partially surrounding said main flow path, is disposed at a side of the separated part of the curved path portion that is directed toward the inlet of the bypass, between the outlet of the bypass and the separated part of the curved path.

4. An air intake measuring apparatus as claimed in claim 3, wherein said hollow space communicates with said curved path portion through an opening in a partition wall located therebetween.

5. An air intake measuring apparatus as claimed in claim 1, wherein said inlet is subjected to a static pressure.

6. An air intake measuring apparatus as claimed in claim 1, wherein said inlet is formed at a side wall of said main air path.

7. An air intake measuring apparatus as claimed in claim 1, wherein a length of said curved path is longer than that of said straight path.

8. An air intake measuring apparatus as claimed in claim 1, further comprising an orifice portion arranged on an upstream side of said element.

* * * * *